United States Patent
Yonemoto

(10) Patent No.: US 9,657,505 B2
(45) Date of Patent: May 23, 2017

(54) HINGE MECHANISM FOR AUTOMATIC DOCUMENT FEEDER AND AUTOMATIC DOCUMENT FEEDER PROVIDED THEREWITH

(71) Applicant: KYOCERA Document Solutions Inc., Osaka (JP)

(72) Inventor: Satoru Yonemoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/175,432

(22) Filed: Jun. 7, 2016

(65) Prior Publication Data

US 2016/0369544 A1    Dec. 22, 2016

(30) Foreign Application Priority Data

Jun. 19, 2015    (JP) ................................. 2015-123978

(51) Int. Cl.
| | |
|---|---|
| *H04N 1/00* | (2006.01) |
| *E05D 11/08* | (2006.01) |
| *E05D 5/12* | (2006.01) |
| *E05D 11/10* | (2006.01) |
| *E05F 1/12* | (2006.01) |
| *G03G 15/00* | (2006.01) |

(Continued)

(52) U.S. Cl.
CPC .............. *E05D 11/082* (2013.01); *E05D 5/12* (2013.01); *E05D 11/1064* (2013.01); *E05D 13/123* (2013.01); *E05F 1/1261* (2013.01); *G03G 15/605* (2013.01); *H04N 1/00554* (2013.01); *E05D 3/02* (2013.01); *E05D 2011/085* (2013.01); *E05Y 2900/606* (2013.01); *E05Y 2900/608* (2013.01)

(58) Field of Classification Search
CPC ........... H04N 1/00554; H04N 1/00519; G03G 15/605; E05D 11/082; E05D 11/1064; E05D 3/02; E05D 5/12; E05F 1/1261
See application file for complete search history.

(56) References Cited

U.S. PATENT DOCUMENTS

| | | | |
|---|---|---|---|
| 6,684,456 B2 * | 2/2004 | Lee .................... | E05D 11/1064 16/286 |
| 2004/0045129 A1 | 3/2004 | Tamehira et al. ............... | 16/223 |

FOREIGN PATENT DOCUMENTS

| | | | |
|---|---|---|---|
| JP | 2003148446 A | * | 5/2003 |
| JP | 2004-101754 A | | 4/2004 |

* cited by examiner

*Primary Examiner* — Luis A Gonzalez
(74) *Attorney, Agent, or Firm* — Stein IP, LLC

(57) ABSTRACT

A hinge mechanism of the present disclosure includes a pair of hinge units each having a hinge base, a hinge upper member, and a shaft, and the hinge mechanism holds an automatic document feeder to be openable/closable in up/down directions with respect to an image reading unit. The hinge base is supported on the image reading unit which reads a document image. The hinge upper member is supported on the automatic document feeder which feeds a document to the image reading unit. The shaft pivotably couples the hinge base and the hinge upper member together. By attaching the hinge upper member to the automatic document feeder, a groove formed in a circumferential surface of the shaft in an annular shape in a circumferential direction of the shaft and a rib provided on the automatic document feeder engage with each other, whereby axial movement of the shaft is restricted.

8 Claims, 10 Drawing Sheets

(51) Int. Cl.
*E05D 13/00* (2006.01)
*E05D 3/02* (2006.01)

HINGE MECHANISM FOR AUTOMATIC DOCUMENT FEEDER AND AUTOMATIC DOCUMENT FEEDER PROVIDED THEREWITH

INCORPORATION BY REFERENCE

This application is based upon and claims the benefit of priority from the corresponding Japanese Patent Application No. 2015-123978 filed on Jun. 19, 2015, the entire contents of which are incorporated herein by reference.

BACKGROUND

The present disclosure relates to a hinge mechanism for an automatic document feeder openably/closably supported on an image reading unit used in digital copiers, image scanners, and the like.

Some conventional image readers mounted in multifunction peripherals and the like employing the electro-photographic process are provided with an automatic document feeder configured to convey sheets of documents one by one to a document placing table (an image reading unit) for reading, and discharges read sheets of documents from the document placing table. Reading methods employable in such an image reader are the following two reading methods. One is a sheet-through method in which, with a document presser closed, a document sheet is read while being automatically conveyed by an automatic document feeder. The other is a document stationary method in which, upon completion of each reading, the document presser is opened and closed in order for a document sheet on the document placing table (a contact glass) to be replaced one by one. In the former, namely, the sheet-through method, a document reading operation is performed with an optical system (scanning means) in the image reader held at a predetermined image reading position without moving for scanning. On the other hand, in the latter, namely, the document stationary method, a reading operation is performed while the optical system is moving for scanning.

With an image reader provided with such an automatic document feeder as described above, because of the weight of the automatic document feeder, a lot of work is required to open/close the document presser for a document reading operation to be performed in the document stationary method. For reduction of such work, there have been proposed various methods where urging force of an elastic member is used to assist the operation of opening/closing the document presser. For example, there has been known a hinge mechanism configured such that, in a state where a document cover (a document presser) is closed, a load torque that biases the document cover in an opening direction remains in a hinge unit.

SUMMARY

According to an aspect of the present disclosure, a hinge mechanism for an automatic document feeder includes a pair of hinge units each having a hinge base, a hinge upper member, and a shaft, and the hinge mechanism holds an automatic document feeder in such a manner as to be openable and closable in up and down directions with respect to an image reading unit. The hinge base is supported on the image reading unit which reads a document image. The hinge upper member is supported on the automatic document feeder which feeds a document to the image reading unit. The shaft pivotably couples the hinge base and the hinge upper member together. When the hinge upper member is attached to the automatic document feeder, a groove, which is formed in a circumferential surface of the shaft in an annular shape in such a manner as to extend in a circumferential direction of the shaft, engages with a rib provided on the automatic document feeder, and thereby movement of the shaft in an axial direction of the shaft is restricted.

Still other objects and specific advantages of the present disclosure will become apparent from the following descriptions of preferred embodiments.

BRIEF DESCRIPTION OF THE DRAWINGS

FIG. 7 is an enlarged front view of the vicinity of the shaft 85 in the hinge unit 80a of the first embodiment as seen from the pivoting side (the left side in FIG. 3), the hinge unit 80a having been assembled by inserting the shaft 85 in a hinge base 81 and a hinge upper member 83 which are held by using a jig 95a;

DETAILED DESCRIPTION

Figure 1:
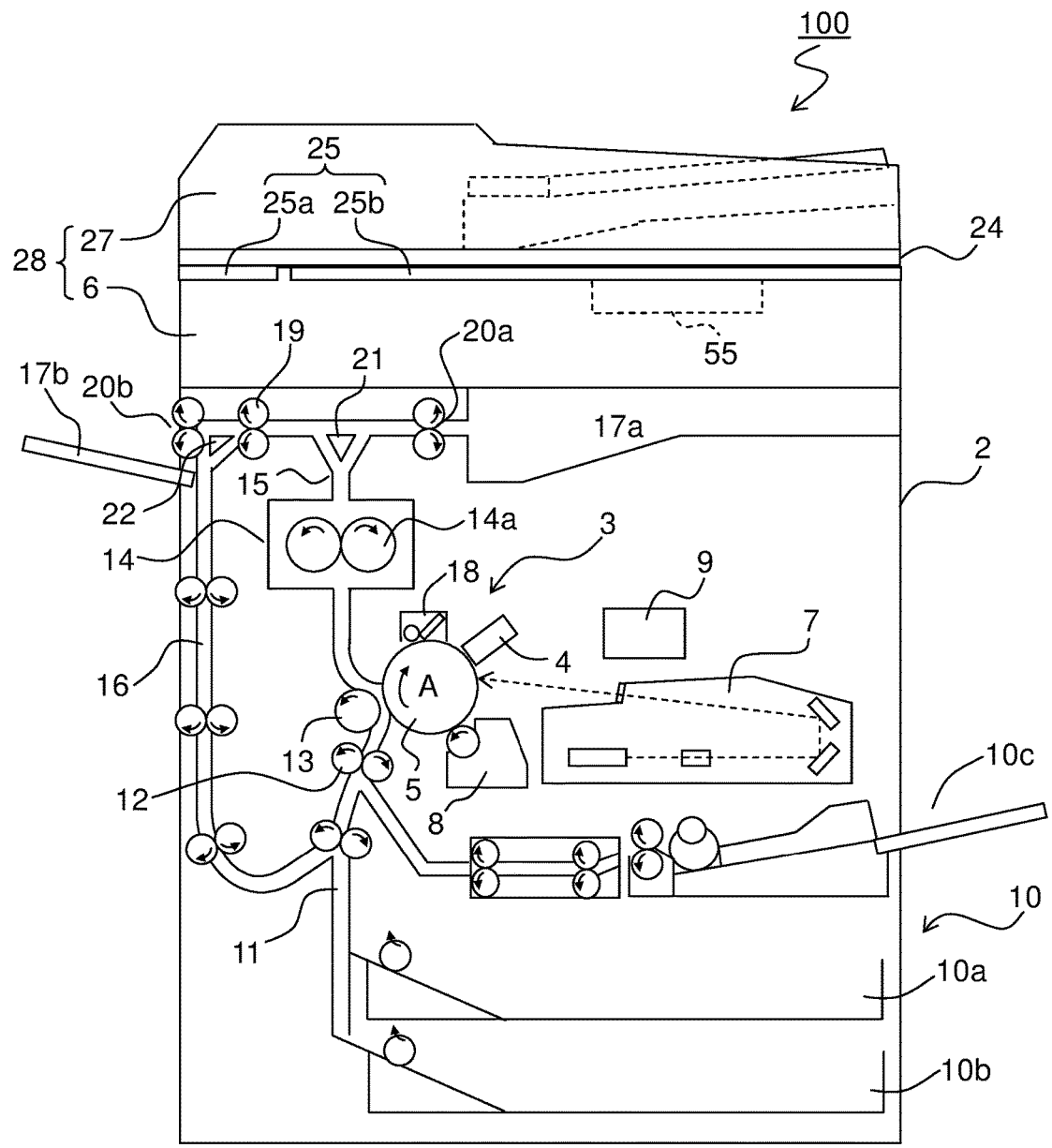
FIG. 1 is a side sectional view illustrating an overall configuration of an image forming apparatus 100 provided with an automatic document feeder 27 according to an embodiment of the present disclosure.

Hereinafter, embodiments of the present disclosure will be described with reference to the accompanying drawings. FIG. 1 is a schematic configuration diagram illustrating an image forming apparatus 100 provided with an automatic document feeder 27 according to an embodiment of the present disclosure. In FIG. 1, in the image forming apparatus 100 (here, a digital multifunction peripheral (MFP) is shown as an example), in performing a copying operation, image data of a document is read and converted into an image signal at an image reading unit 6, which will be described later. On the other hand, in an image forming unit 3 disposed inside an MFP main body 2, a photosensitive drum 5, which rotates in direction A shown in the figure, is uniformly charged by a charging unit 4. Then, a laser beam emitted from an exposure unit (such as a laser scanning unit) 7 based on the document image data read at the image reading unit 6 forms an electrostatic latent image on the photosensitive drum 5, to which a developer (henceforth, a toner) is caused to adhere by a developing unit 8, and thereby toner image is formed. The toner is supplied to the developing unit 8 from a toner container 9.

Toward the photosensitive drum 5 in the image forming unit 3, on which the toner image has been formed as described above, a sheet is conveyed from a sheet feeding mechanism 10 via a sheet conveyance path 11 and a registration roller pair 12. Then, at the image forming unit 3, the toner image formed on a surface of the photosensitive drum 5 is transferred onto the sheet by a transfer roller 13 (an image transfer unit). Then, the sheet having the toner image transferred thereon is separated from the photosensitive drum 5, and conveyed to a fixing unit 14 having a fixing roller pair 14a, where the toner image is fixed on the sheet. The sheet that has passed through the fixing unit 14 is sent to a sheet conveyance path 15 branching off in a plurality of directions, and a conveyance direction thereof is set by path-switching mechanisms 21 and 22 which are provided at branching points in the sheet conveyance path 15 and which each have a plurality of path-switching guides. Thereafter, the sheet is discharged directly (or after being sent to a reversing conveyance path 16 to be subjected to double-sided copying) to a sheet discharge unit that is composed of a first discharge tray 17a and a second discharge tray 17b.

Furthermore, although not illustrated, a static eliminator which eliminates residual electric charge on the surface of the photosensitive drum 5 is provided on a downstream side of a cleaner 18. Moreover, the sheet feeding mechanism 10 is composed of a plurality of sheet feeding cassettes 10a and 10b which are detachably attached to the MFP main body 2 and in each of which sheets are stacked, and a stack bypass (a manual sheet feeding tray) 10c disposed above the plurality of sheet feeding cassettes 10a and 10b. The sheet feeding mechanism 10 is linked via the sheet conveyance path 11 to the image forming unit 3 which includes the photosensitive drum 5, the developing unit 8, etc.

The image reading unit 6 is disposed in an upper portion of the MFP main body 2. On an upper surface of the image reading unit 6, there is disposed a contact glass 25 as a document placing table, and the automatic document feeder 27 is openably/closably provided. The contact glass 25 includes an automatic document reading glass 25a and a manual document reading glass 25b, and there are provided a white reference plate for shading correction disposed to face the automatic document reading glass 25a, and a document pressing unit laid above the white reference plate to press the white reference plate toward the automatic document reading glass 25a (neither of which is illustrated). On a lower surface of the automatic document feeder 27, there is provided a platen (a document presser) 24 which presses and holds a document placed on the manual document reading glass 25b. The image reading unit 6 and the automatic document feeder 27 together constitute an image reader 28.

The sheet conveyance path 15 is specifically configured to first branch off into two right and left paths on a downstream side of the fixing roller pair 14a, and, of the two branch paths, one path (which is branched off to the right in FIG. 1) is formed to communicate with the first discharge tray 17a. The other path (which is branched off to the left in FIG. 1) further branches off after passing through a conveyance roller pair 19 into two paths, one of which (in FIG. 1, a path branched off to the left) communicates with the second discharge tray 17b. On the other hand, the other path (in FIG. 1, a path branched off downward) communicates with the reversing conveyance path 16.

Figure 2:
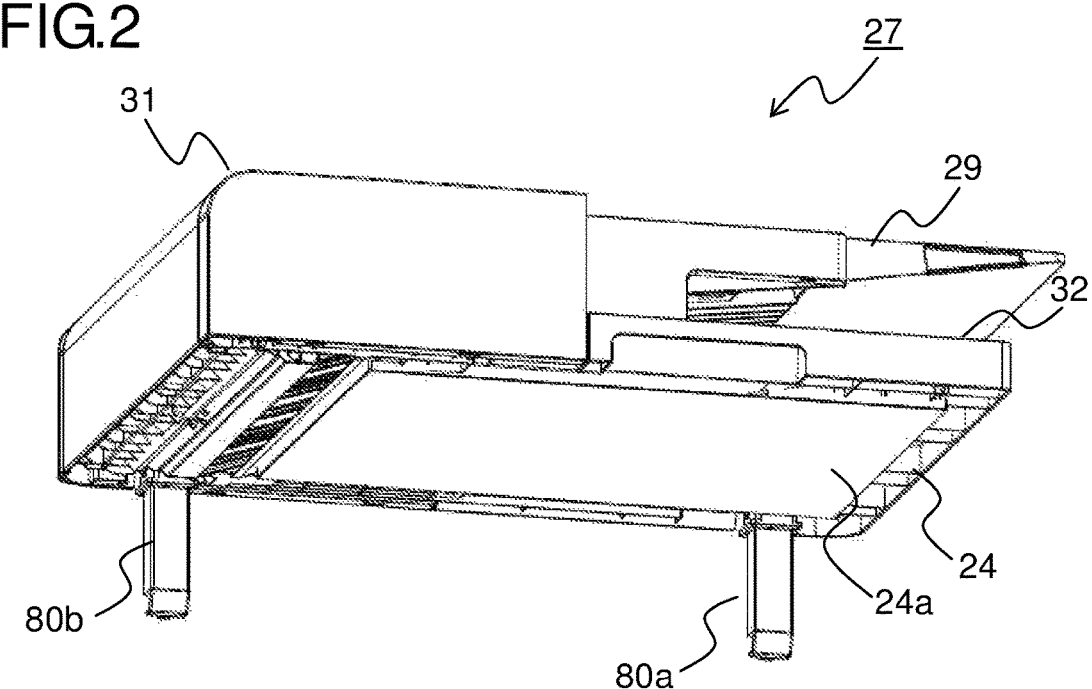
FIG. 2 is an external perspective view of the automatic document feeder 27 as seen from below.

FIG. 2 is an external perspective view of an automatic document feeder attached on an image reader according to an embodiment of the present disclosure, as seen from below. The automatic document feeder 27 has a document feeding tray 29 for stacking a plurality of sheets of documents thereon, and the automatic document feeder 27 conveys the documents stacked on the document feeding tray 29 one by one onto an upper surface of the automatic document reading glass 25a. The document feeding tray 29 is attached to a frame of the automatic document feeder 27.

Furthermore, with respect to the frame of the automatic document feeder 27, a cover member 31 is supported to be openable/closable about one end of the frame (lower left in FIG. 2) as a pivotal fulcrum. By opening the cover member 31, it is possible to expose a document conveyance path (unillustrated) extending from the document feeding tray 29 to a document discharge tray 32 to clear a jam. On a lateral side of the cover member 31, the document discharge tray 32 is formed integrally with part of an upper surface of the platen 24. The automatic document feeder 27 is pivotably supported on one end (rear end as seen from the front of the image forming apparatus 100) of the upper surface of the image reading unit 6 by a pair of hinge units 80a and 80b. The hinge units 80a and 80b constitute a hinge mechanism which holds the automatic document feeder 27 in such a manner as to be openable and closable in up and down directions with respect to the image reading unit 6.

On a rear surface of the platen 24, there is provided a document mat 24a which covers and presses substantially all over a document placed on the manual document reading glass 25b. The document mat 24a, which is typically formed of a sheet member, sponge, etc., is compressed due to the weight of the automatic document feeder 27, and thereby securely holds a document placed on the manual document reading glass 25b.

Figure 3:
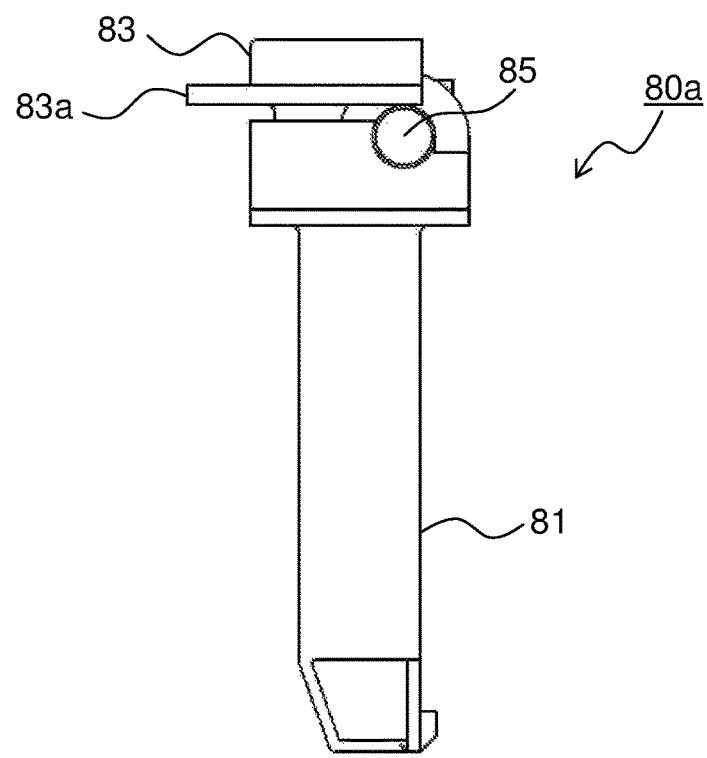
FIG. 3 is a side view of a hinge unit according to a first embodiment attached to the automatic document feeder 27 (a hinge unit 80a which is attached on a right-side part of the image forming apparatus 100 as seen from the front side)
Figure 4:
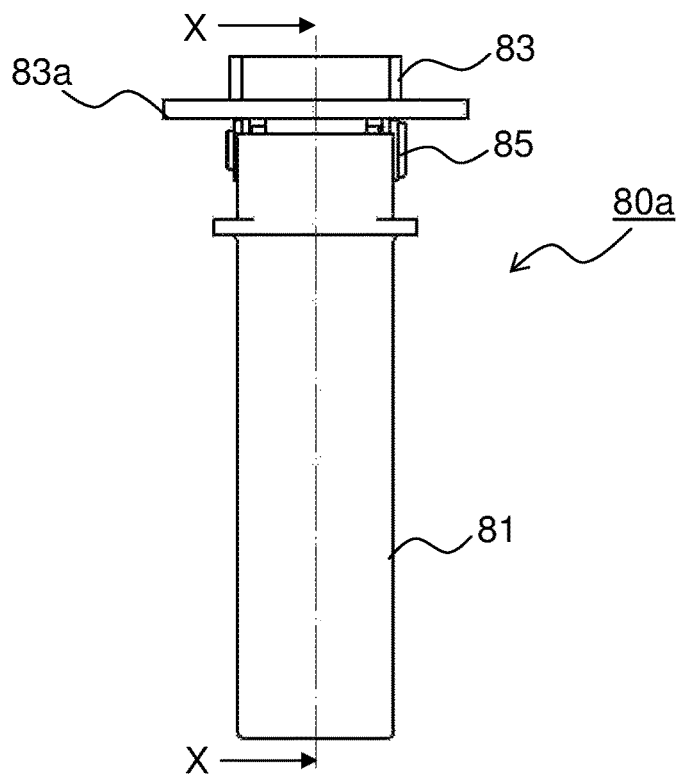
FIG. 4 is a front view of the hinge unit 80a of the first embodiment as seen from a pivoting side (the left side in FIG. 3)
Figure 5:
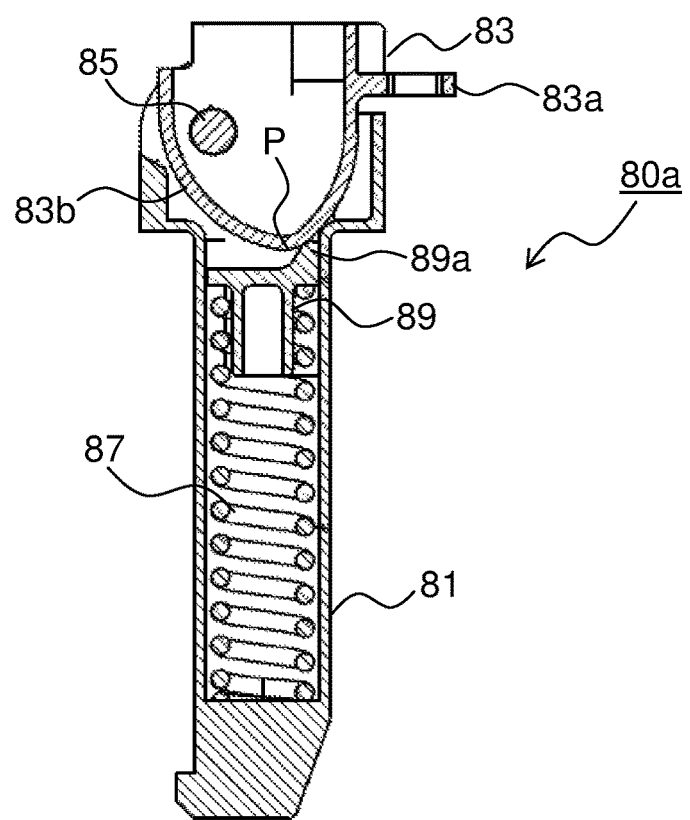
FIG. 5 is a side sectional view of the hinge unit 80a of the first embodiment (taken along line XX of FIG. 4).

Next, a detailed description will be given of the configuration of the hinge units 80a and 80b attached to the automatic document feeder 27. FIG. 3 is a side view of the hinge unit 80a of the first embodiment, which is attached to the automatic document feeder 27, FIG. 4 is a front view of the hinge unit 80a of the first embodiment as seen from a pivoting side (the left side in FIG. 3), and FIG. 5 is a side sectional view (taken along line XX of FIG. 4) of the hinge unit 80a of the first embodiment. Note that the description here will focus on the hinge unit 80a disposed on the right side as viewed from the front side of the image forming apparatus 100, and a description will be omitted of the hinge unit 80b on the left side which has basically the same configuration as the hinge unit 80a. Note also that FIG. 3 to FIG. 5 show the hinge unit 80a when the automatic document feeder 27 is in a closed position.

The hinge unit 80a has a hinge base 81 supported on a frame of the image reading unit 6, a hinge upper member 83 fixed to the automatic document feeder 27, and a shaft 85 pivotably coupling the hinge base 81 and the hinge upper member 83 together. Detailed configurations of the hinge base 81, the hinge upper member 83, and the shaft 85 will be described later.

The hinge base 81 is a hollow cylindrical member, in an inside of which there are arranged a hinge spring 87 which includes a compression coil spring, and a slider 89 which is supported on an upper end of the hinge spring 87. The slider 89 is biased upward by the hinge spring 87.

The hinge upper member 83 has a flange 83a fixed to a frame of the automatic document feeder 27 (see FIG. 2), and a sliding portion 83b which contacts the slider 89. In the flange 83a, there are formed screw holes 84a and 84b (see FIG. 8). The sliding portion 83b is formed in an arc shape such that distance from the shaft 85 varies, and when the automatic document feeder 27 is in the closed position, a projecting portion 89a of the slider 89 is positioned on a side (right side in FIG. 5) opposite to the shaft 85 with respect to an end portion P of the sliding portion 83b. That is, in the state where the automatic document feeder 27 is in the closed position, a counterclockwise pivoting of the hinge upper member 83 is restricted by the projecting portion 89a.

When the automatic document feeder 27 is caused to pivot in an opening direction from the state shown in FIG. 5, the hinge upper member 83 is caused to pivot in the counterclockwise direction in FIG. 5. At this time, the end portion P of the sliding portion 83b climbs over the projecting portion 89a of the slider 89, and the projecting portion 89a presses such part of the sliding portion 83b as is located closer to the shaft 85 than the end portion P is. Thereby, a rotation torque in the counterclockwise direction is applied from the hinge spring 87 to the hinge upper member 83 via the slider 89 contacting the sliding portion 83b. This allows a user to make the automatic document feeder 27 pivot in the opening direction with a slight force.

On the other hand, when causing the automatic document feeder 27 to pivot in a closing direction from the opened state, the contact position of the slider 89 with respect to the sliding portion 83b moves in a direction away from the shaft 85, and thus the hinge upper member 83 pivots in a clockwise direction in FIG. 5 while compressing the hinge spring 87. As a result, a rotation torque in a reverse direction (the opening direction) applied to the hinge upper member 83 via the slider 89 from the hinge spring 87 becomes increasingly larger as a rotation angle of the automatic document feeder 27 in the closing direction increases. Thus, it is possible to prevent the automatic document feeder 27 from slamming.

Depending on in which of the hinge units 80a and 80b it is disposed, the hinge spring 87 has different characteristics, such as a different material, a different wire diameter, a different number of coil turns, a different coil diameter, and a different free length. This is because of the following reason. That is, the automatic document feeder 27 supported by the hinge units 80a and 80b has components such as a conveyance roller pair and a motor arranged inside the cover member 31, as a result of which the left side of the automatic document feeder 27 is heavier than the right side thereof as seen from the front side (the pivoting side) of the image forming apparatus 100. Thus, the hinge unit 80b disposed on the left side needs a stronger rotation torque than the hinge 80a disposed on the right side. By thus giving different characteristics to the hinge springs 87 used in the left and right hinge units 80a and 80b according to the centroid position of the automatic document feeder 27, it is possible to make the automatic document feeder 27 openable and closable smoothly.

Figure 6:
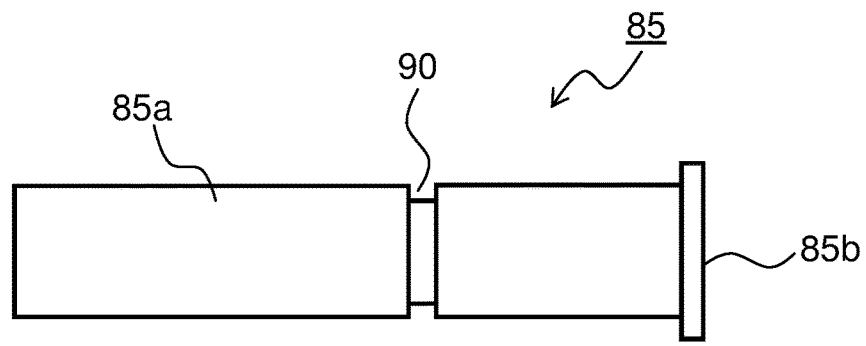
FIG. 6 is a side view of a shaft 85 provided in each of hinge units 80a and 80b of the first embodiment.

FIG. 6 is a side view of the shaft 85 provided one in each of the hinge units 80a and 80b of the first embodiment. The shaft 85 has a cylindrical shaft main body 85a, and a head 85b which is formed at one end of the shaft main body 85a and has a larger diameter than the shaft main body 85a. In an outer circumferential surface of the shaft main body 85a, groove 90 is formed in an annular shape in a position slightly on the head 85b side of its center in the longitudinal direction.

Figure 7:
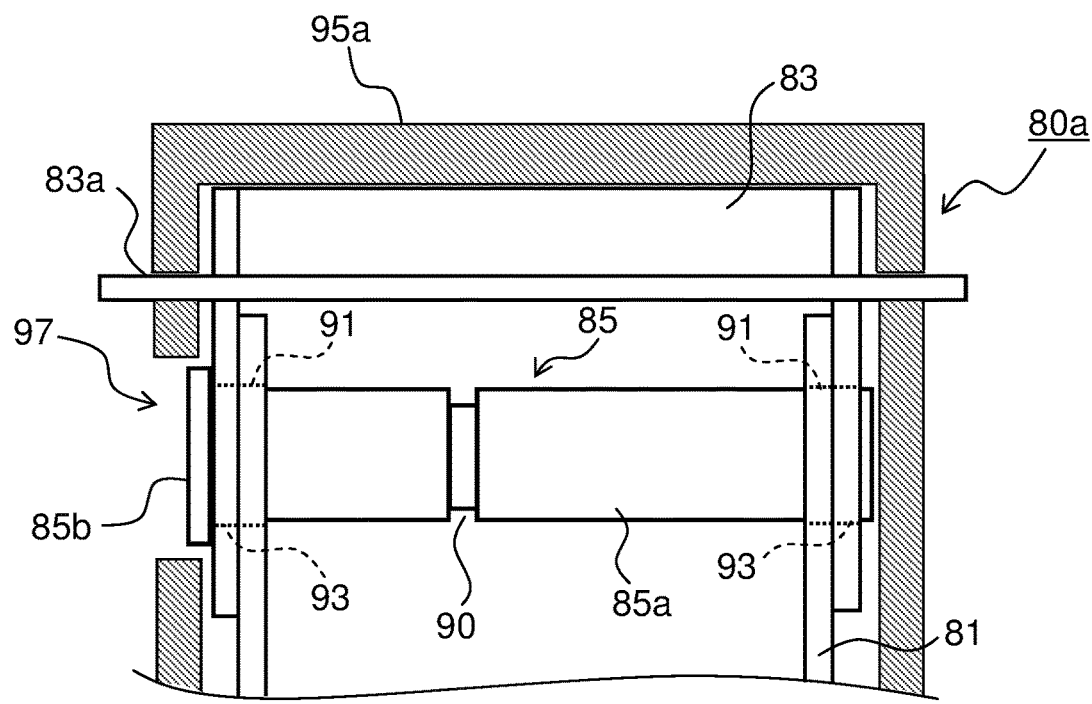
Figure 8:
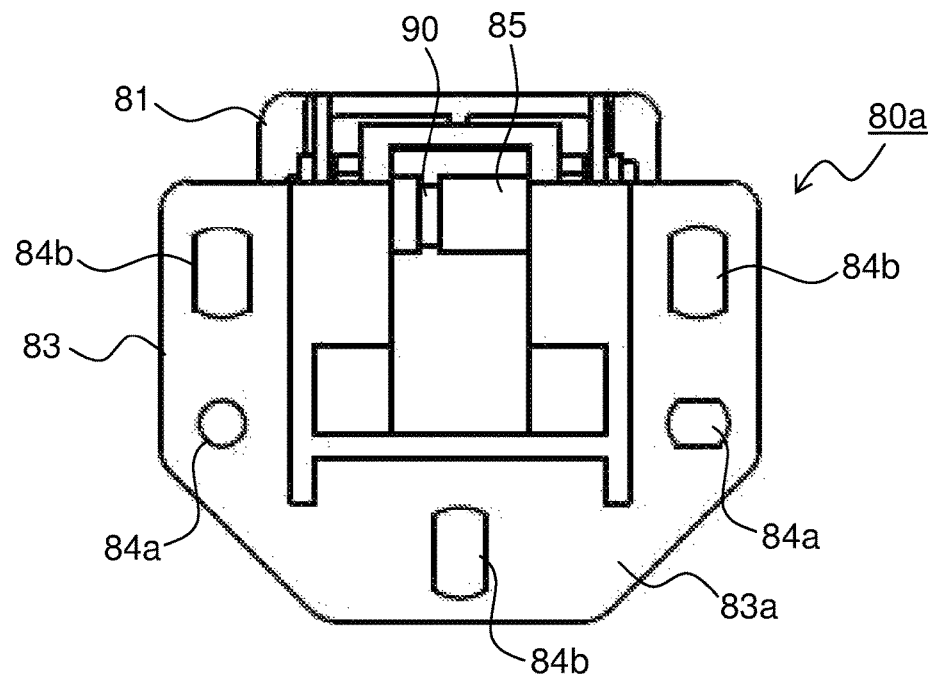
FIG. 8 is a plan view of the hinge unit 80a of the first embodiment as seen from above.
Figure 9:
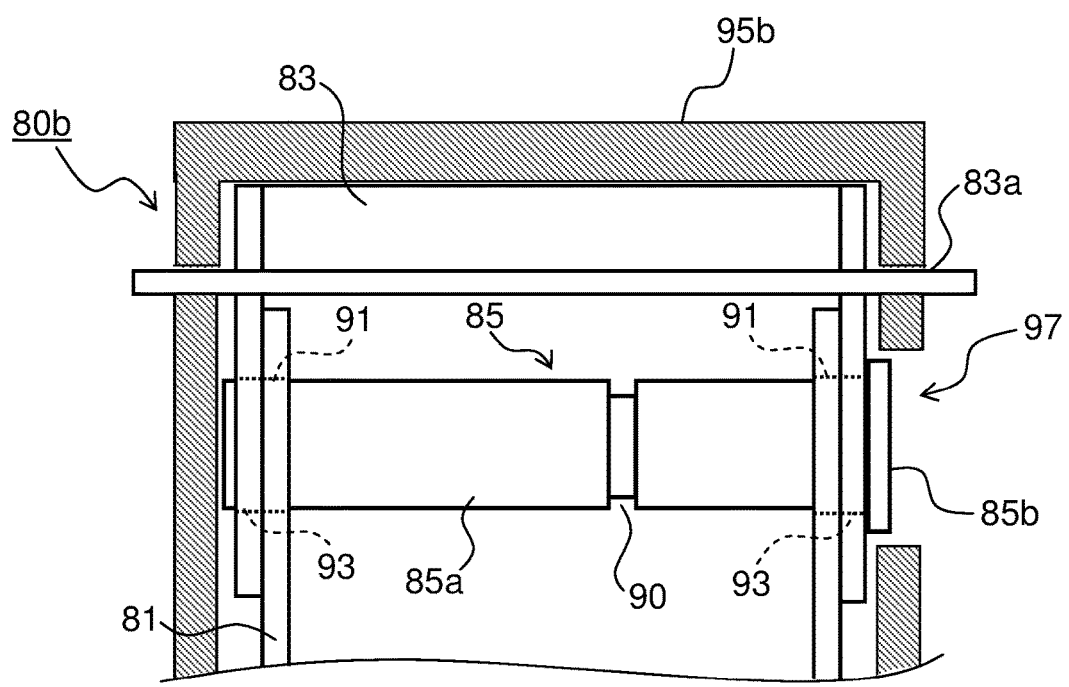
FIG. 9 is an enlarged front view of the vicinity of the shaft 85 in the hinge unit 80b of the first embodiment as seen from the pivoting side (the left side in FIG. 3), the hinge unit 80b having been assembled by inserting the shaft 85 in a hinge base 81 and a hinge upper member 83 which are held by using a jig 95b.
Figure 10:
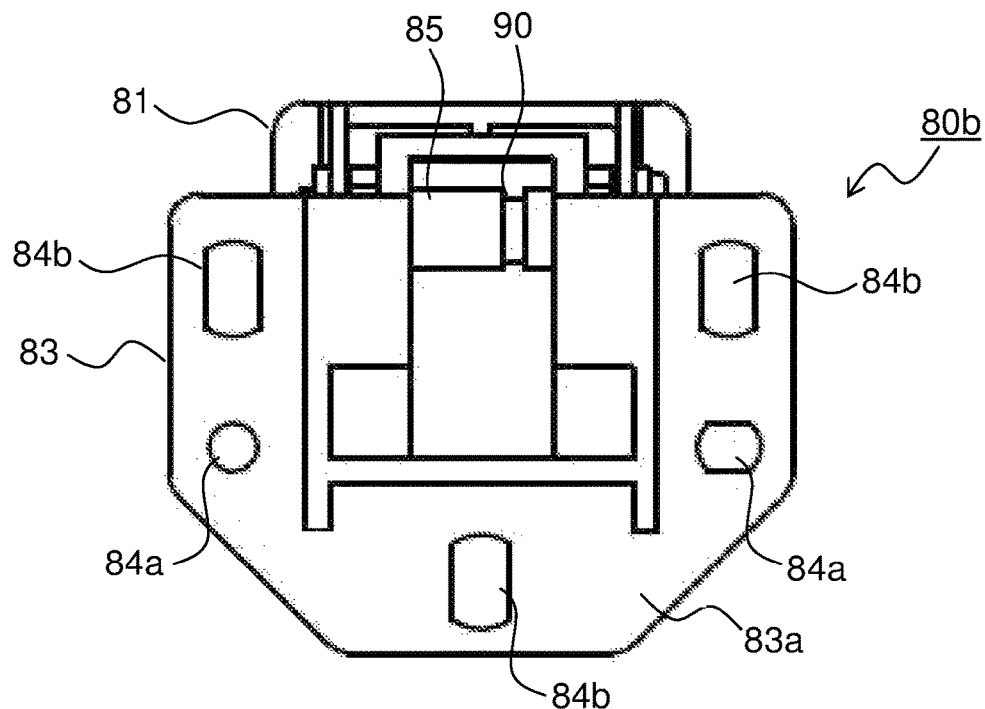
FIG. 10 is a plan view of the hinge unit 80b of the first embodiment as seen from above.

Next, a description will be given of how the hinge units 80a and 80b of the first embodiment are assembled. FIG. 7 and FIG. 9 are enlarged front views of the vicinity of the shaft 85 of each of the hinge units 80a and 80b, respectively, of the first embodiment, as seen from the pivoting side (the left side in FIG. 3), the hinge units 80a and 80b each having been assembled by inserting the shaft 85 in the hinge base 81 and the hinge upper member 83 held by using jigs 95a and 95b, respectively. FIG. 8 and FIG. 10 are top views of the assembled hinge units 80a and 80b, respectively, as seen from above.

The hinge base 81 has a through hole 91 formed therein through which the shaft 85 is to be inserted. The hinge upper member 83 has a through hole 93 formed therein through which the shaft 85 is to be inserted. Inner diameters of the through holes 91 and 93 are slightly larger than an outer diameter of the shaft main body 85a.

As described above, the hinge spring 87 and the slider 89 are arranged inside the hinge base 81. When the hinge upper member 83 is attached to an upper end of the hinge base 81, an upward biasing force acts on the hinge upper member 83 from the hinge spring 87 via the slider 89. With this in mind, in assembling the hinge units 80a and 80b, as illustrated in FIG. 7 and FIG. 9, the jigs 95a and 95b are used, respectively, each of which holds the hinge base 81 and the hinge upper member 83 from above and below, such that the through holes 91 and 93 are superposed on each other, with the hinge spring 87 compressed. In this state, via a shaft insertion hole 97 formed in each of the jigs 95a and 95b, the shaft 85 is inserted. Thereafter, the jigs 95a, 95b are removed and the assembly of the hinge units 80a and 80b is completed.

In each of the assembled hinge units 80a, and 80b, the biasing force (load) of the hinge spring 87 acts in a diameter direction of the shaft 85, and thus, the shaft 85 is pressed in a diameter direction of the through holes 91 and 93. This eliminates the possibility of the shaft 85 easily coming off from each of the assembled hinge units 80a and 80b.

In a case where the left and right hinge units 80a and 80b are assembled from common components as in the present embodiment, the hinge spring 87 is disposed inside the hinge base 81. Thus, it is not easy to tell the hinge spring 87 in the hinge unit 80a and the hinge spring 87 in the hinge unit 80b from each other just by the exteriors of the assembled hinge units 80a and 80b.

Here, the shaft insertion hole 97 is formed only on one side (the left side in FIG. 7) in the jig 95a used to assemble the hinge unit 80a. With this configuration, in assembling the hinge unit 80a, the shaft 85 can be inserted only from the left side in FIG. 7 and FIG. 8, and cannot be inserted from the right side in FIG. 7 and FIG. 8. Further, in the assembled hinge unit 80a, the groove 90 is located on the left of the center as seen from the pivoting side.

On the other hand, in the jig 95b used to assemble the hinge unit 80b, the shaft insertion hole 97 is formed only on a side (the right side in FIG. 8) opposite to the side on which the shaft insertion hole 97 is formed in the jig 95a. With this configuration, in assembling the hinge unit 80b, the shaft 85 can be inserted only from the right side in FIG. 9 and FIG. 10, and cannot be inserted from the left side in FIG. 9 and FIG. 10. Further, in the assembled hinge unit 80b, the groove 90 is located on the right of the center as seen from the pivoting side.

As described above, in assembling each of the hinge units 80a and 80b, the direction in which the shaft 85 can be inserted is uniquely determined for each of the hinge units 80a and 80b, and the groove 90 is disposed in the assembled hinge unit 80a in a position different from the position in which the groove 90 is disposed in the assembled hinge unit 80b. This makes it easy to tell the right and left hinge units 80a and 80b from each other by the difference in position of the groove 90 between the assembled hinge units 80a and 80b, which helps prevent any inconvenience that could be caused by confusion of the hinge unit 80a with the hinge unit 80b.

Here, the hinge springs 87 respectively disposed in the hinge units 80a and 80b are different from each other in characteristic (biasing force), as a result of which the holding force of the jig 95a used for assembling the hinge unit 80a and the holding force of the jig 95b used for assembling the hinge unit 80b are different from each other according to the difference in biasing force between the hinge springs 87. That is, since the hinge units 80a and 80b are each assembled by using a dedicated one of the jigs 95a and 95b, there is no possibility for an operator to mistake the jigs 95a and 95b for each other.

Figure 11:
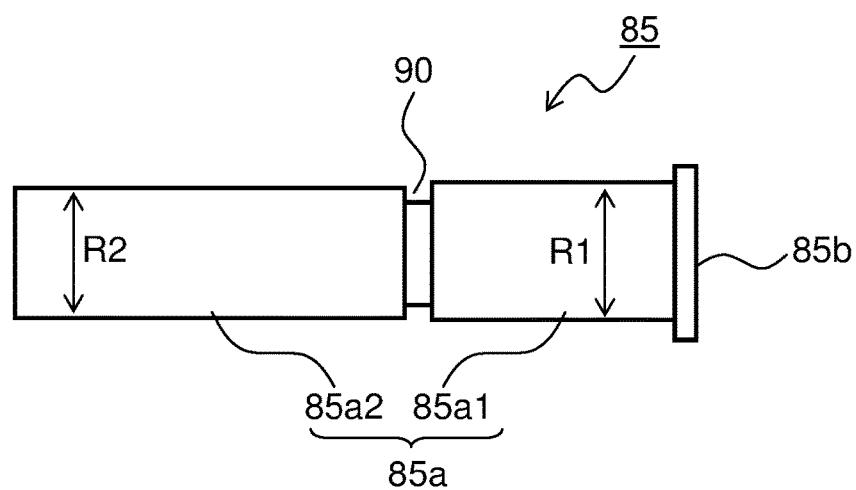
FIG. 11 is a side view of a shaft 85 provided in each of hinge units 80a and 80b of a second embodiment.

FIG. 11 is a side view of a shaft 85 provided in each of hinge units 80a and 80b of a second embodiment of the present disclosure. The shaft 85 has a cylindrical shaft main body 85a, and a head 85b which is formed at one end of the shaft main body 85a and which has a larger diameter than the shaft main body 85a. In an outer circumferential surface of the shaft main body 85a, a groove 90 is formed in an annular shape in a position slightly on the head 85b side of its center in the longitudinal direction. The shaft main body 85a is separated into a first main body portion 85a1 located on the head 85b side with respect to the groove 90 and a second main body portion 85a2 disposed on the side opposite from the head 85b with respect to the groove 90. An outer diameter R1 of the first main body portion 85a1 is formed slightly larger than an outer diameter R2 of the second main body portion 85a2.

Figure 12:
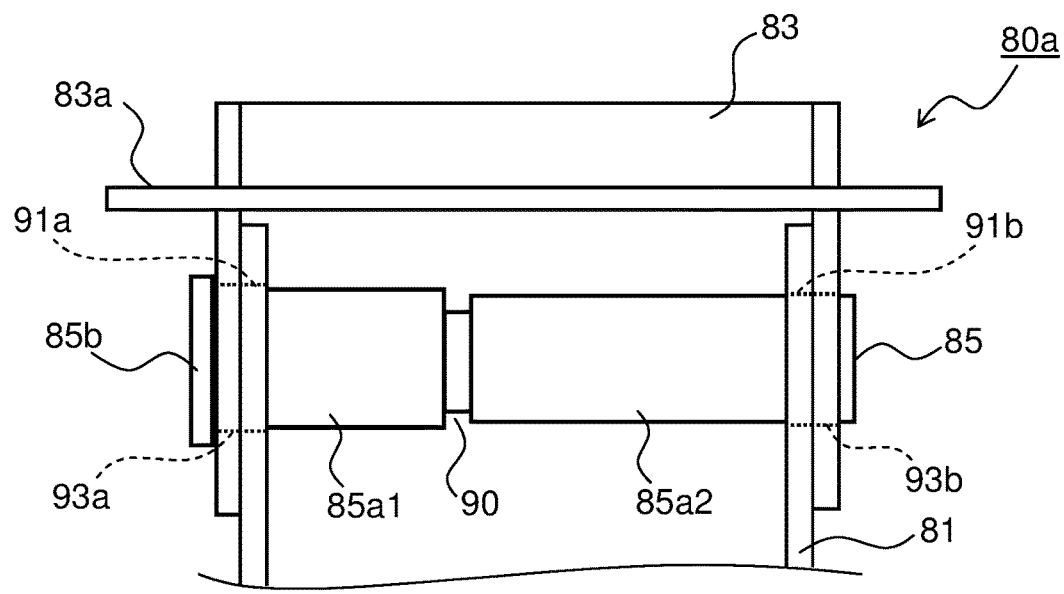
FIG. 12 is an enlarged front view of the vicinity of the shaft 85 in the hinge unit 80a of the second embodiment as seen from the pivoting side (the left side in FIG. 3), the hinge unit 80a having been assembled by inserting the shaft 85 in a hinge base 81 and a hinge upper member 83.
Figure 13:
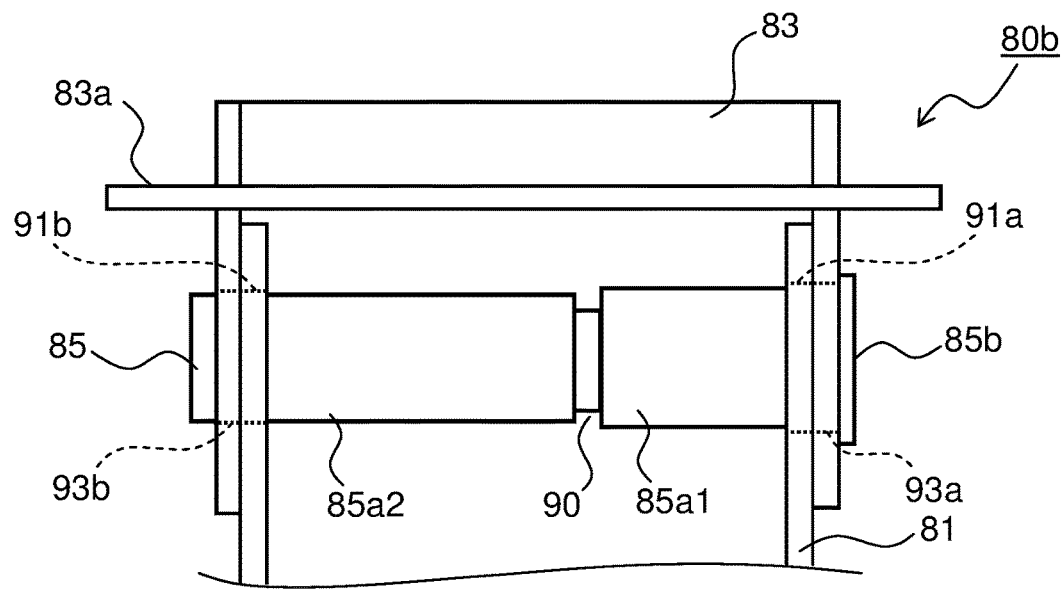
FIG. 13 is an enlarged front view of the vicinity of the shaft 85 in the hinge unit 80b of the second embodiment as seen from the pivoting side (the left side in FIG. 3), the hinge unit 80b having been assembled by inserting the shaft 85 in a hinge base 81 and a hinge upper member 83.

Next, a description will be given of how the hinge units 80a and 80b of the second embodiment are assembled. FIG. 12 and FIG. 13 are enlarged front views of the vicinity of the shaft 85 of the hinge units 80a and 80b, respectively, of the second embodiment, as seen from the pivoting side (the left side in FIG. 3), the hinge units 80a and 80b each having been assembled by inserting the shaft 85 in the hinge base 81 and the hinge upper member 83 held by using jigs 95a and 95b, respectively. In FIG. 12 and FIG. 13, the jigs 95a and 95b (see FIG. 7 and FIG. 9) each for holding the hinge base 81 and the hinge upper member 83 are not illustrated.

As illustrated in FIG. 12, first through holes 91a and 93a are located on the left side as seen from the pivoting side of the hinge unit 80a (this side of the sheet of FIG. 12), and diameters of the first through holes 91a and 93a are slightly larger than the outer diameter R1 of the first main body portion 85a1. Further, second through holes 91b and 93b are located on the right side as seen from the pivoting side, and diameters of the second through holes 91b and 93b are slightly larger than the outer diameter R2 of the second main body portion 85a2 but slightly smaller than the outer diameter R1 of the first main body portion 85a1. As a result, in assembling the hinge unit 80a, the shaft 85 is insertable only from the left side in FIG. 12, and uninsertable from the right side in FIG. 12. Further, in the assembled hinge unit 80a, the groove 90 is located on the left of the center as seen from the pivoting side.

As illustrated in FIG. 13, the first through holes 91a and 93a and the second through holes 91b and 93b formed in the hinge base 81 and the hinge upper member 83 of the hinge unit 80b are arranged to be bilaterally symmetric to the first through holes 91a and 93a and the second through holes 91b and 93b of the hinge unit 80a shown in FIG. 12. As a result, in assembling the hinge unit 80b, the shaft 85 is insertable only from the right side in FIG. 13, and uninsertable from the left side in FIG. 13. Further, in the assembled hinge unit 80b, the groove 90 is located on the right of the center as seen from the pivoting side.

Thus, in assembling each of the hinge units 80a and 80b, the direction in which the shaft 85 can be inserted is uniquely determined, and the groove 90 is disposed in the assembled hinge unit 80a in a position different from the position in which the groove 90 is disposed in the assembled hinge unit 80b. In the present embodiment, the direction in which the shaft 85 is inserted is determined by the inner diameters of the first through holes 91a and 93a and the second through holes 91b and 93b. Thus, by forming shaft insertion holes 97 at both right and left ends of the jig 95a used for assembling the hinge unit 80a, it is possible to use a same common jig as the jigs 95a and 95b for assembling the hinge units 80a and 80b.

Figure 14:
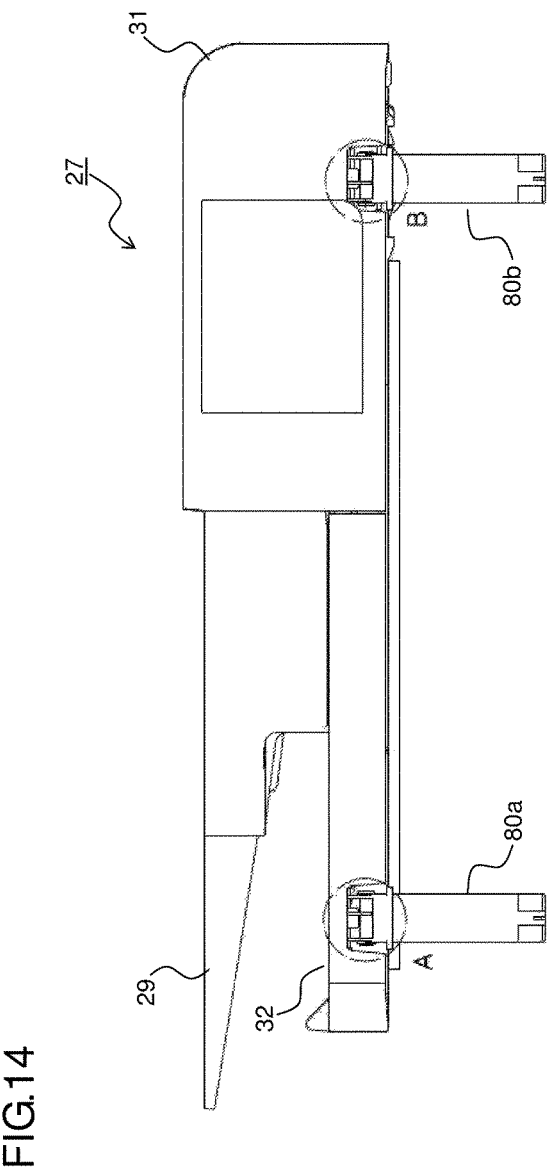
FIG. 14 is a side view of the automatic document feeder 27 to which the hinge units 80a and 80b are attached, as seen from the hinge units 80a and 80b side.
Figure 15:
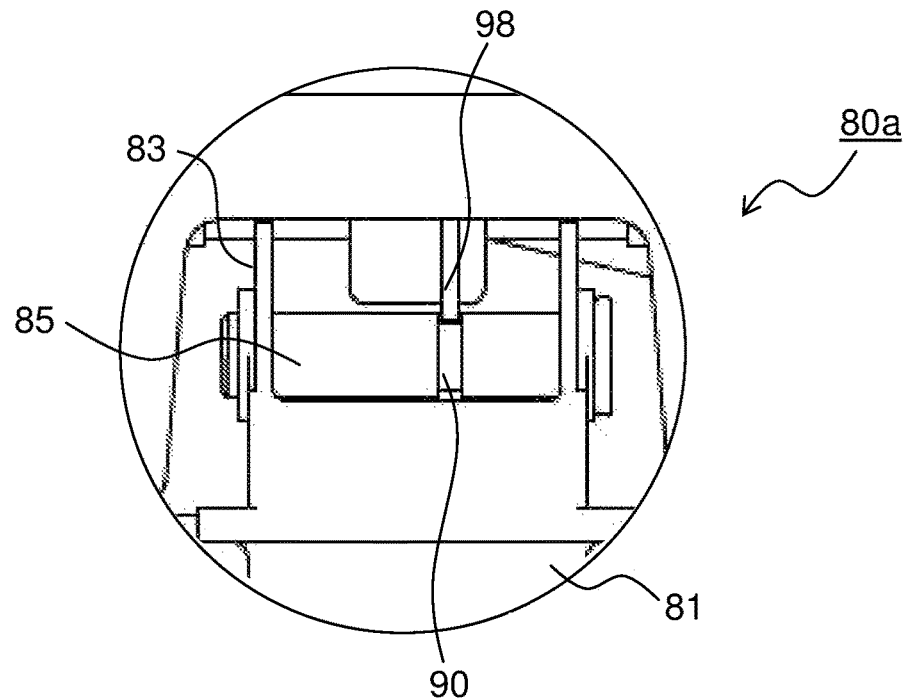
FIG. 15 is an enlarged view of the vicinity of where the hinge unit 80a is coupled to the automatic document feeder 27 (the area inside the circle A of FIG. 14)
Figure 16:
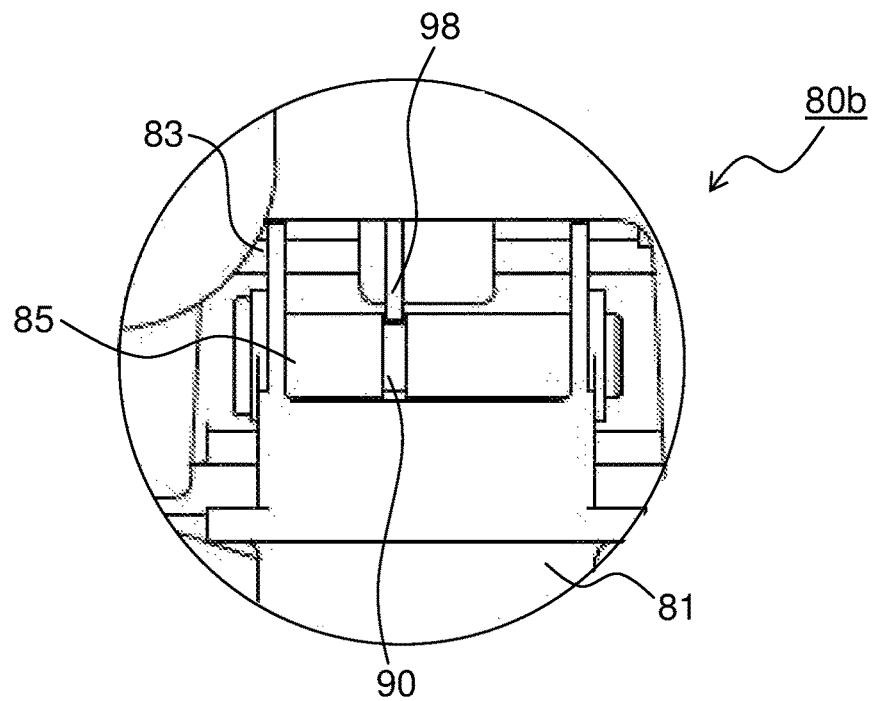
FIG. 16 is an enlarged view of the vicinity of where the hinge unit 80b is coupled to the automatic document feeder 27 (the area inside the circle B of FIG. 14)
Figure 17:
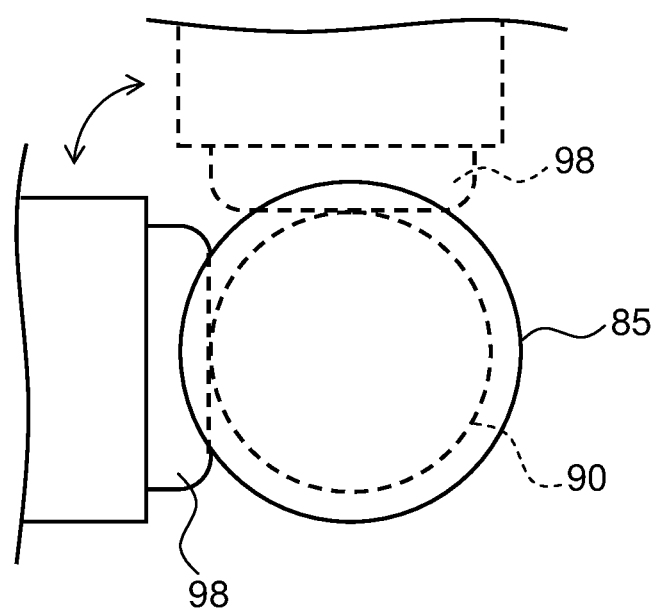
FIG. 17 is a side view of a groove 90 of the shaft 85 and a rib 98 in a state where the rib 98 is engaged in the groove 90, as seen from the axial direction of the shaft 85.

FIG. 14 is a side view of the automatic document feeder 27 to which the hinge units 80a and 80b of the present disclosure are attached, as seen from the hinge units 80a and 80b side (the rear surface side of the image forming apparatus 100). FIG. 15 and FIG. 16 are respectively enlarged views of vicinities of where the hinge units 80a and 80b are coupled to the automatic document feeder 27 (the areas inside the circles A and B of FIG. 14). FIG. 17 is a side view of the groove 90 of the shaft 85 and the rib 98 in a state where the rib 98 is engaged in the groove 90, as seen from the axial direction of the shaft 85. Here, FIG. 15 and FIG. 16 illustrate the hinge units 80a and 80b, respectively, as seen from the side (the right side in FIG. 3) which is opposite to the side from which the hinge units 80a and 80b are seen in FIGS. 7 to 10, 12, and 13, and thus the positions of the grooves 90 of the hinge units 80a and 80b appear to be laterally reversed.

In attaching each of the hinge units 80a and 80b to the automatic document feeder 27, the screw holes 84a and 84b formed in the flange 83a of the hinge upper member 83 are superposed with unillustrated screw holes formed on the automatic document feeder 27 side, through which screws are inserted to fix the hinge units 80a and 80b to the automatic document feeder 27. At this time, as illustrated in FIG. 15 and FIG. 16, the ribs 98 are formed on the automatic document feeder 27 at positions corresponding to the grooves 90 of the hinge units 80a and 80b, such that the ribs 98 engage in the corresponding one of the grooves 90 in a state where the hinge upper members 83 are fixed to the document feeder 27.

According to the configurations of the first and second embodiments described above, the engagement of the rib 98 in the groove 90 restricts the movement of the shaft 85 in the axial direction, and this helps prevent coming off of the shaft 85 from the hinge base 81 and the hinge upper member 83, which eliminates the need of additionally providing a mechanism for preventing the coming off of the shaft 85.

Further, on the automatic document feeder 27 side in each of the hinge units 80a and 80b, the rib 98 is formed in a position corresponding to the groove 90, and thus, reverse attachment of the hinge units 80a and 80b would be impossible, because the rib 98 comes in contact with the outer circumferential surface of the shaft main body 85a (the second main body portion 85a2). Thus, even if the hinge unit 80a and the hinge unit 80b are mistaken for each other, it is possible to prevent erroneous attachment of the hinge units 80a and 80b to the automatic document feeder 27.

Further, as illustrated in FIG. 17, along with the opening/closing of the automatic document feeder 27, the rib 98 moves in the circumferential direction of the shaft 85 while being kept engaged in the groove 90. Thus, the engagement of the rib 98 in the groove 90 is maintained at any angle from the closed state (see the solid line in FIG. 17) to the open state (see the broken line in FIG. 17) of the automatic document feeder 27, and this eliminates the possibility of the shaft 85 coming off from either the hinge unit 80a or 80b when the automatic document feeder 27 is opened or closed.

It should be understood that the present disclosure is not limited to the above embodiments, and various modifications are possible within the scope of the present disclosure. For example, the shapes of the hinge base 81, the hinge upper member 83, the shaft 85, the slider 89, etc. of each of the above-described embodiments are not particularly limited, and can be appropriately set according to the configuration, etc. of the apparatus.

The present disclosure is applicable to an image reader provided with an automatic document feeder that is openably/closably supported on an image reading unit via a hinge unit. By use of the present disclosure, it is possible to offer a document reader hinge mechanism that does not require a mechanism for preventing coming off of a shaft, and that can be assembled without difficulty.

What is claimed is:

1. A hinge mechanism for an automatic document feeder, the hinge mechanism comprising a pair of hinge units, wherein
the pair of hinge units each include:
a hinge base supported on an image reading unit which reads a document image;
a hinge upper member supported on an automatic document feeder which feeds a document to the image reading unit;
a shaft which pivotably couples the hinge base and the hinge upper member together;
a groove which is formed in a circumferential surface of the shaft in an annular shape in a circumferential direction of the shaft, and which restricts movement of the shaft in an axial direction of the shaft by engaging with a rib provided on the automatic document feeder when the hinge upper member is attached to the automatic document feeder, and the hinge mechanism holds the automatic document feeder in such a manner as to be openable and closable in up and down directions with respect to the image reading unit.

2. The hinge mechanism according to claim 1, wherein
the hinge base is provided with a hinge spring which gives the hinge upper member a rotation torque in a direction for upwardly opening the automatic document feeder, and
a biasing force of the hinge spring acts in a diameter direction of the shaft.

3. The hinge mechanism according to claim 2, wherein
the hinge spring provided in one of the pair of hinge units and the hinge spring provided in another of the pair of hinge units have different biasing forces according to a centroid position of the automatic document feeder.

4. The hinge mechanism according to claim 1, wherein
the pair of hinge units are different from each other in position of the groove in an axial direction of the shaft, and
the rib is provided in a position corresponding to the groove of each of the pair of hinge units.

5. The hinge mechanism according to claim 4, wherein
the shaft of one the pair of hinge units and the shaft of another of the pair of hinge units have a same configuration where the groove is formed in a position off a center in the axial direction of the shaft, and
the pair of hinge units are different from each other in direction of insertion of the shaft with respect to the hinge base and the hinge upper member.

6. The hinge mechanism according to claim 5, wherein
the shaft includes:
a first main body portion which is formed in a cylindrical shape on one of two sides separated in an axial direction of the shaft by the groove; and
a second main body portion which is formed to have a smaller diameter than the first main body portion, on another of the two sides separated in the axial direction of the shaft by the groove,
the hinge base and the hinge upper member have a first through hole formed on one of left and right sides thereof, the first through hole having a diameter that is larger than an outer diameter of the first main body portion,
the hinge base and the hinge upper member have a second through hole formed on another of the left and right sides thereof, the second through hole having a diameter that is larger than an outer diameter of the second main body portion but is smaller than the outer diameter of the first main body portion, and
the pair of hinge units are bilaterally symmetric to each other in terms of positions of the first through hole and the second through hole.

7. The hinge mechanism according to claim 1, wherein
the rib and the groove remain engaged with each other at all angles from a state where the automatic document feeder is closed to a state where the automatic document feeder is opened.

8. An automatic document feeder comprising the hinge mechanism according to claim 1.

\* \* \* \* \*